US008174573B2

(12) United States Patent
Lin et al.

(10) Patent No.: US 8,174,573 B2
(45) Date of Patent: May 8, 2012

(54) MONITORING CAMERA

(75) Inventors: Hsin-Chieh Lin, Taipei (TW); Julian Lin, Taipei (TW)

(73) Assignee: VTC Electronics Corporation, Taipei (TW)

( * ) Notice: Subject to any disclaimer, the term of this patent is extended or adjusted under 35 U.S.C. 154(b) by 915 days.

(21) Appl. No.: 12/204,871

(22) Filed: Sep. 5, 2008

(65) Prior Publication Data
US 2010/0060731 A1 Mar. 11, 2010

(51) Int. Cl.
*H04N 7/18* (2006.01)

(52) U.S. Cl. .......................... 348/143; 348/144; 348/373

(58) Field of Classification Search .................. 348/143, 348/144, 373
See application file for complete search history.

(56) References Cited

U.S. PATENT DOCUMENTS

| 6,234,691 | B1 * | 5/2001 | Jones et al. ................... 396/427 |
| 7,217,045 | B2 * | 5/2007 | Jones ........................... 396/427 |
| 7,621,680 | B2 * | 11/2009 | Frick et al. .................... 396/419 |
| 7,841,782 | B2 * | 11/2010 | Tatewaki ....................... 396/427 |
| 7,990,468 | B2 * | 8/2011 | Yamamoto ..................... 348/373 |
| 2001/0022627 | A1 * | 9/2001 | Bernhardt ...................... 348/373 |
| 2006/0050150 | A1 * | 3/2006 | Yamane ......................... 348/151 |
| 2008/0211913 | A1 * | 9/2008 | Togawa ......................... 348/144 |
| 2010/0225802 | A1 * | 9/2010 | Yamamoto ..................... 348/373 |

* cited by examiner

*Primary Examiner* — Emmanuel L Moise
*Assistant Examiner* — Waseem Ashraf
(74) *Attorney, Agent, or Firm* — Alan Kamrath; Kamrath IP Lawfirm, PA

(57) ABSTRACT

A monitoring camera has a base, a camera module and a casing. The base has a parapet formed on the base. The parapet has a memory slot and at least one pair of guide slots formed oppositely on the parapet. Each guide slot has a notch extending toward the bottom of the parapet. The casing corresponds to and covers the parapet and has at least one pair of guide protrusions formed on the casing. The guide protrusions respectively engage corresponding guide slots. When unscrewing the casing, the guide protrusions will correspondingly move and be mounted in the notches and the memory slot is accessible. Therefore, the casing need not to be completely detached from the base to allow a removable memory to be installed or removed easily.

10 Claims, 6 Drawing Sheets

MONITORING CAMERA

BACKGROUND OF THE INVENTION

1. Field of the Invention

The present invention relates to a monitoring camera having a removable memory installed, and more particularly to a monitoring camera that allows easy installation and removal of the removable memory.

2. Description of Related Art

Monitoring cameras are commonly installed in many buildings for improved security. In general, the monitoring cameras are mounted downwardly on ceilings of the buildings and capture images near entrances and exits.

However, linking many cameras to a central location for monitoring and recording is expensive and difficult. Therefore, a monitoring camera having removable memory installed is invented, which simplifies installation whilst providing image recording. With reference to FIG. 5, the monitoring camera comprises a base (40), a camera module (50) and a casing (60). The base (40) is mounted on a ceiling and has a bottom and a parapet (41). The parapet (41) is formed on and around the bottom of the base (40) and has a memory slot (42) and a thread (43) formed on the parapet (41). The camera module (50) is mounted on the bottom of the base (40) and is surrounded by the parapet (41). The camera module (50) has a memory connector corresponding to the memory slot (42). The memory connector allows a removable memory to insert in and electrically connect to the inserted removable memory. The casing (60) is mounted over the parapet (41) and the camera module (50) and has multiple protrusions. The protrusions engage the thread on the parapet (41). Accordingly, a technician has to completely unscrew the casing (60) to install or remove the removable memory.

However, the technician must climb high to reach the monitoring camera and use one hand to unscrew and hold the casing (60), then another to remove or install removable memory. This is inconvenient and may cause an accident.

With reference to FIG. 6, a conventional monitoring camera may further comprise a connection line (70). The connection line (70) is mounted in the base (40) and is connected to the casing (60). When the casing (60) is unscrewed, the casing (60) will be held by the connection line (70) so it is safer for the technician not to hold the casing (60) with one hand.

However, to dispose the connection line (70) in the base (40), designing an arrangement of the base (40) becomes complicated and the connection line (70) may block the camera module (50). Cost for manufacturing the conventional monitoring camera is increased. Furthermore, manufacturing the connection line (70) also increases the cost of manufacturing the conventional monitoring camera.

To overcome the shortcomings, the present invention provides a monitoring camera that allows easily installing and uninstalling the removable memory to mitigate or obviate the aforementioned problems.

SUMMARY OF THE INVENTION

The main objective of the invention is to provide a monitoring camera that allows easily installing and uninstalling the removable memory.

The monitoring camera in accordance with the present invention comprises a base, a camera module and a casing. The base has a parapet formed on the base. The parapet has a memory slot and at least one pair of guide slots formed oppositely on the parapet. Each guide slot has a notch extending toward the bottom of the parapet. The casing corresponds to and covers the parapet and has at least one pair of guide protrusions formed on the casing. The guide protrusions respectively engage corresponding guide slots. When unscrewing the casing, the guide protrusions will correspondingly move and be mounted in the notches and the memory slot is accessible. Therefore, the casing need not to be completely detached from the base to allow a removable memory to be installed or removed easily.

Other objectives, advantages and novel features of the invention will become more apparent from the following detailed description when taken in conjunction with the accompanying drawings.

DETAILED DESCRIPTION OF PREFERRED EMBODIMENT

Figure 1:
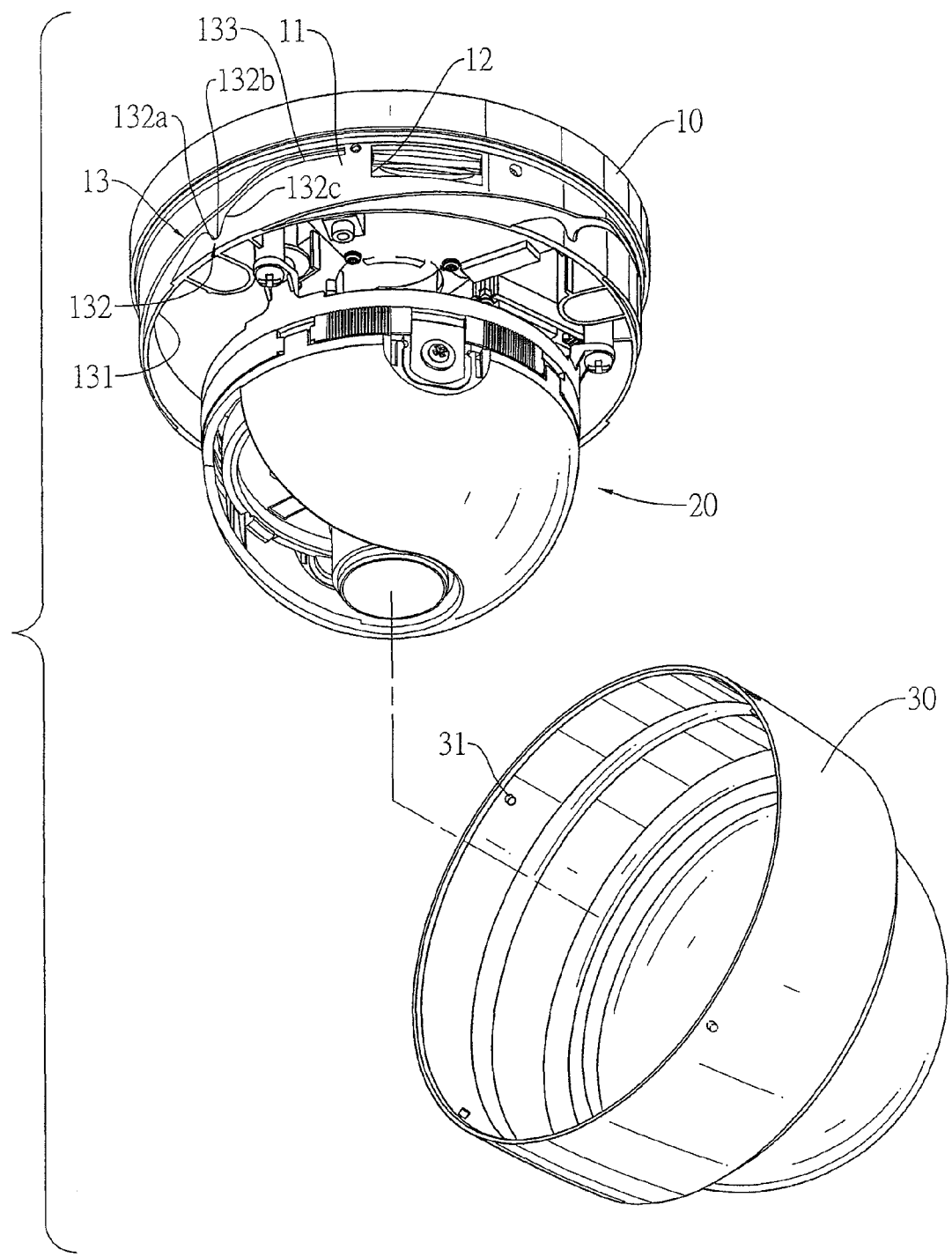
FIG. 1 is a partially exploded perspective view of a monitoring camera in accordance with the present invention.

With reference to FIG. 1, a monitoring camera in accordance with the present invention comprises a base (10), a camera module (20) and a casing (30).

The base (10) has a bottom and a parapet (11).

The parapet (11) is formed on and may be smaller than the bottom of the base (10) and has a memory slot (12), an outer surface and at least one pair of guide slots (13).

The outer surface has a bottom.

The memory slot (12) is formed, maybe horizontally, in the parapet (11) adjacent to the bottom of the base (10).

Figure 2:
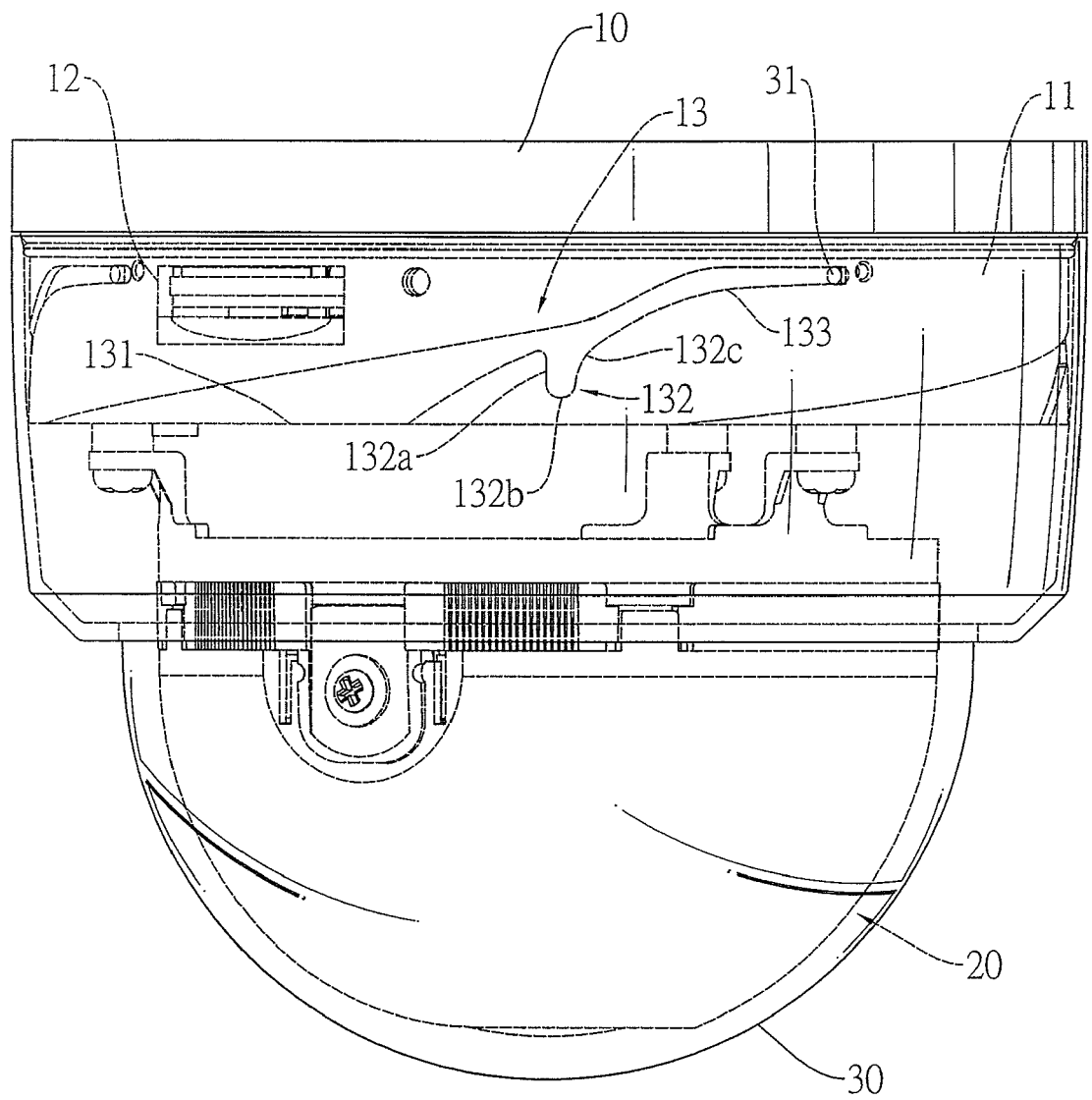
FIG. 2 is a side view of the monitoring camera in accordance with the present invention.

The at least one pair of guide slots (13) are formed oppositely on the outer surface of the parapet (11). In a preferred embodiment of the present invention, the parapet (11) has two pairs of guide slots (13). With further reference to FIG. 2, each guide slot (13) may further comprise an entrance section (131), a support section (133) and a notch (132).

The entrance section (131) is formed obliquely from the bottom of the outer surface of the parapet (11) and tapers inwardly.

The support section (133) curves parabolically toward the bottom of the base (10) then runs parallel with the base (10) and communicates with a corresponding entrance section (131).

The notch (132) extends towards the bottom of the parapet (11) below the memory slot (12) and may be between and communicate with the corresponding entrance and support sections (131, 133). The notch (132) may have a vertical wall (132a), a notch bottom (132b) and a rounded wall (132c).

The vertical wall (132a) connects to the corresponding entrance section (131).

The notch bottom (132b) connects to the corresponding vertical wall (132a) and is lower than the memory slot (12).

The rounded wall (132c) connects to the notch bottom (132b) and is adjacent to the corresponding support section (133).

The camera module (20) is mounted on the bottom of the base (10). The camera module (20) has a memory connector corresponding to the memory slot (12).

The casing (30) corresponds to and covers the parapet (11) and the camera module (20), may abut the bottom of the base (10) and has an inner surface and at least one pair of guide protrusions (31). The at least one pair of guide protrusions (31) are formed oppositely on the inner surface of the casing (30), engage and move along the corresponding guide slots (13). In a preferred embodiment of the present invention, the casing (30) has two pairs of guide protrusions (31) corresponding respectively to the guide slots (13). With further reference to FIG. 2, when mounting the casing (30) on the bottom of the base (10), the guide protrusions (31) enter the corresponding entrance sections (131) and move along the guide slots (13). When the guide protrusions (31) move to the support sections (133) of the guide slots (13), the support sections (133) hold the guide protrusions (31) so the casing (30) is fixed on and abuts the base (10).

Figure 3:
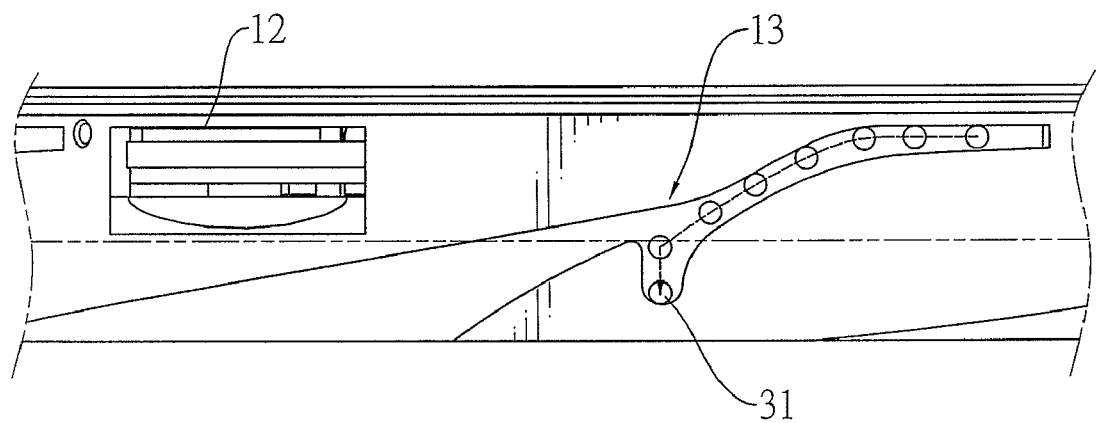
FIG. 3 is a side view of a base of the monitoring camera in FIG. 2 showing a trajectory of one of the guide protrusions moving to a notch of one of the guide slots.
Figure 4:
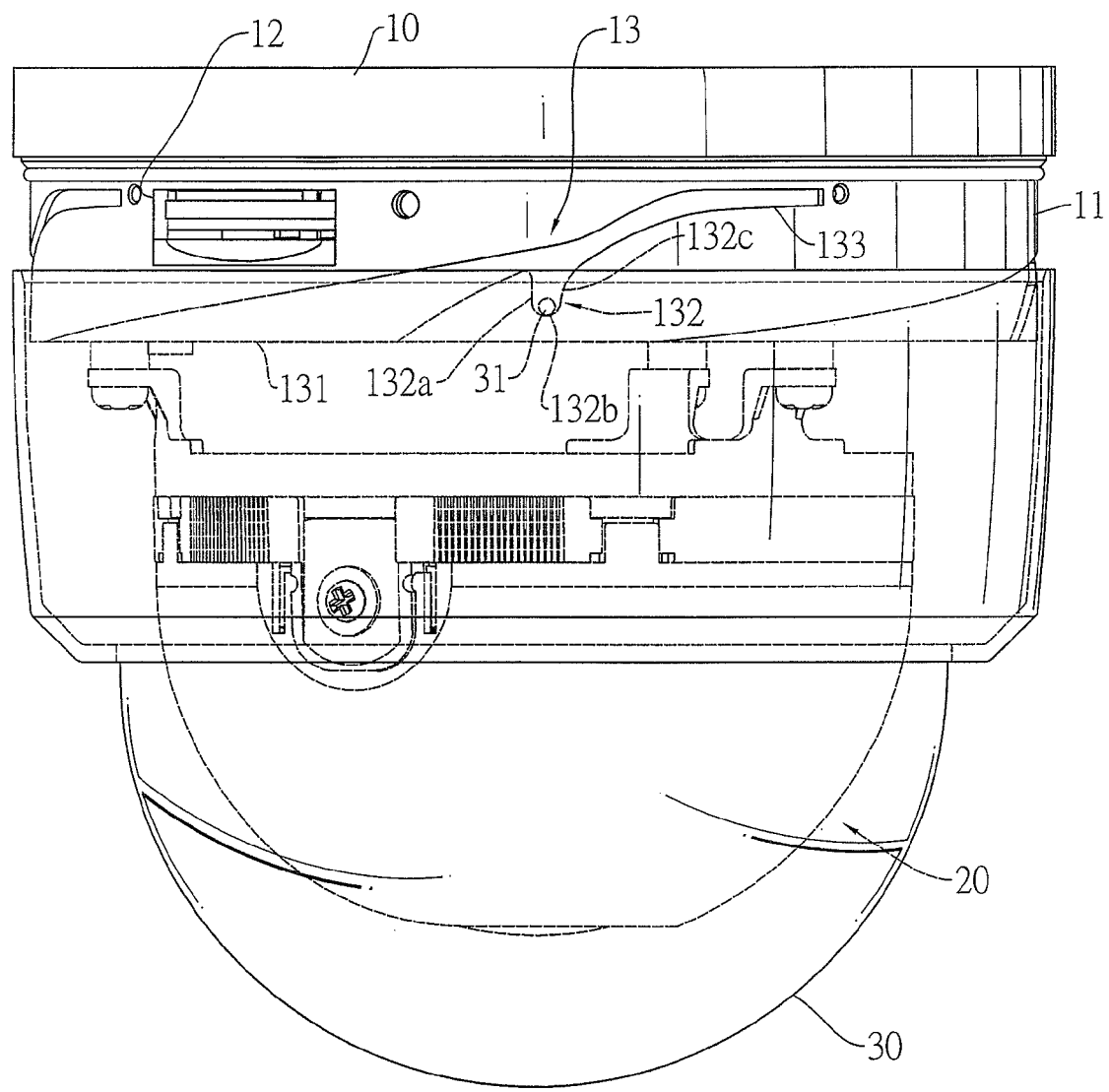
FIG. 4 is a side view of the monitoring camera in accordance with the present invention internal elements being shown in phantom lines.
Figure 5:
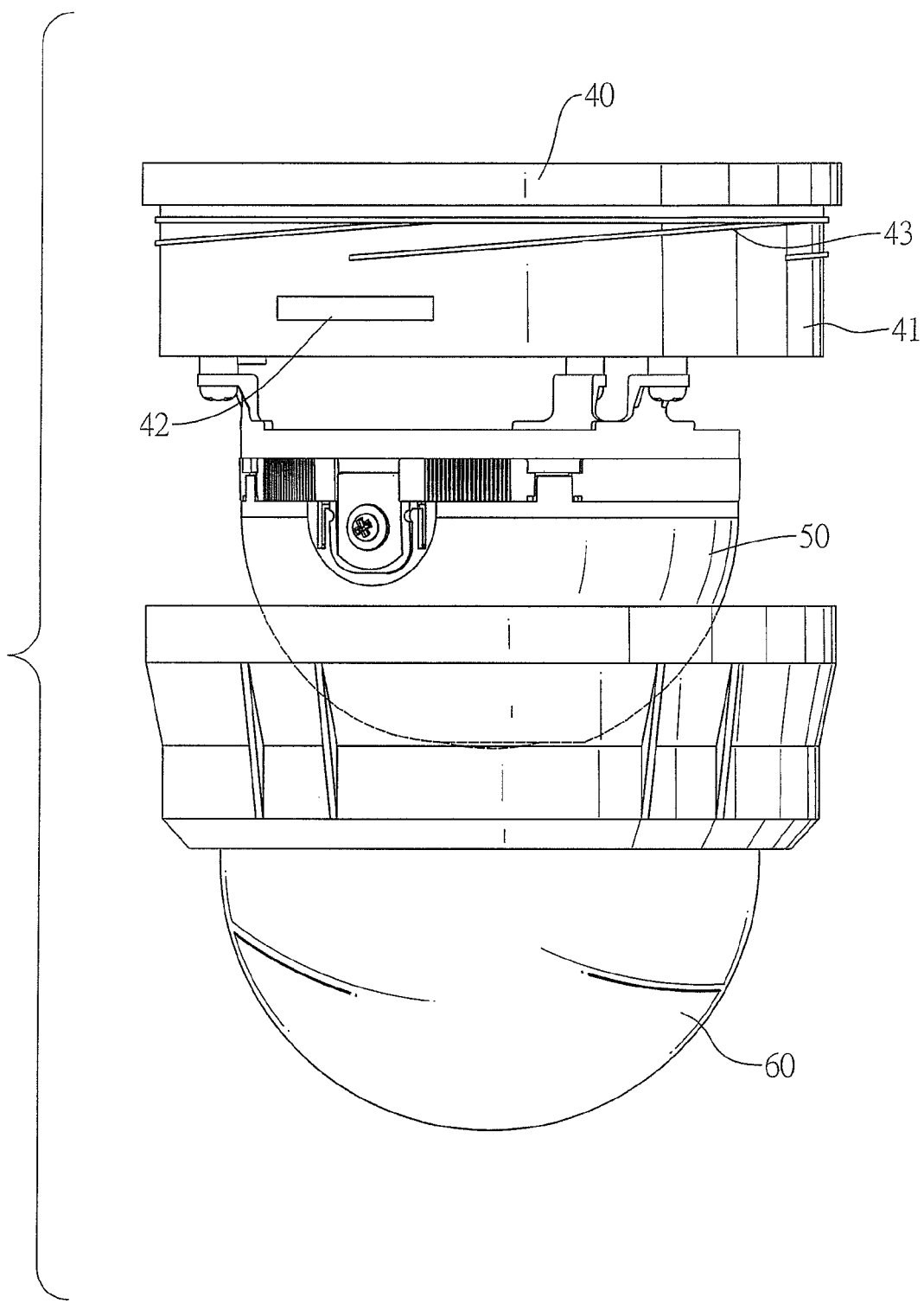
FIG. 5 is an exploded side view of a conventional monitoring camera.
Figure 6:
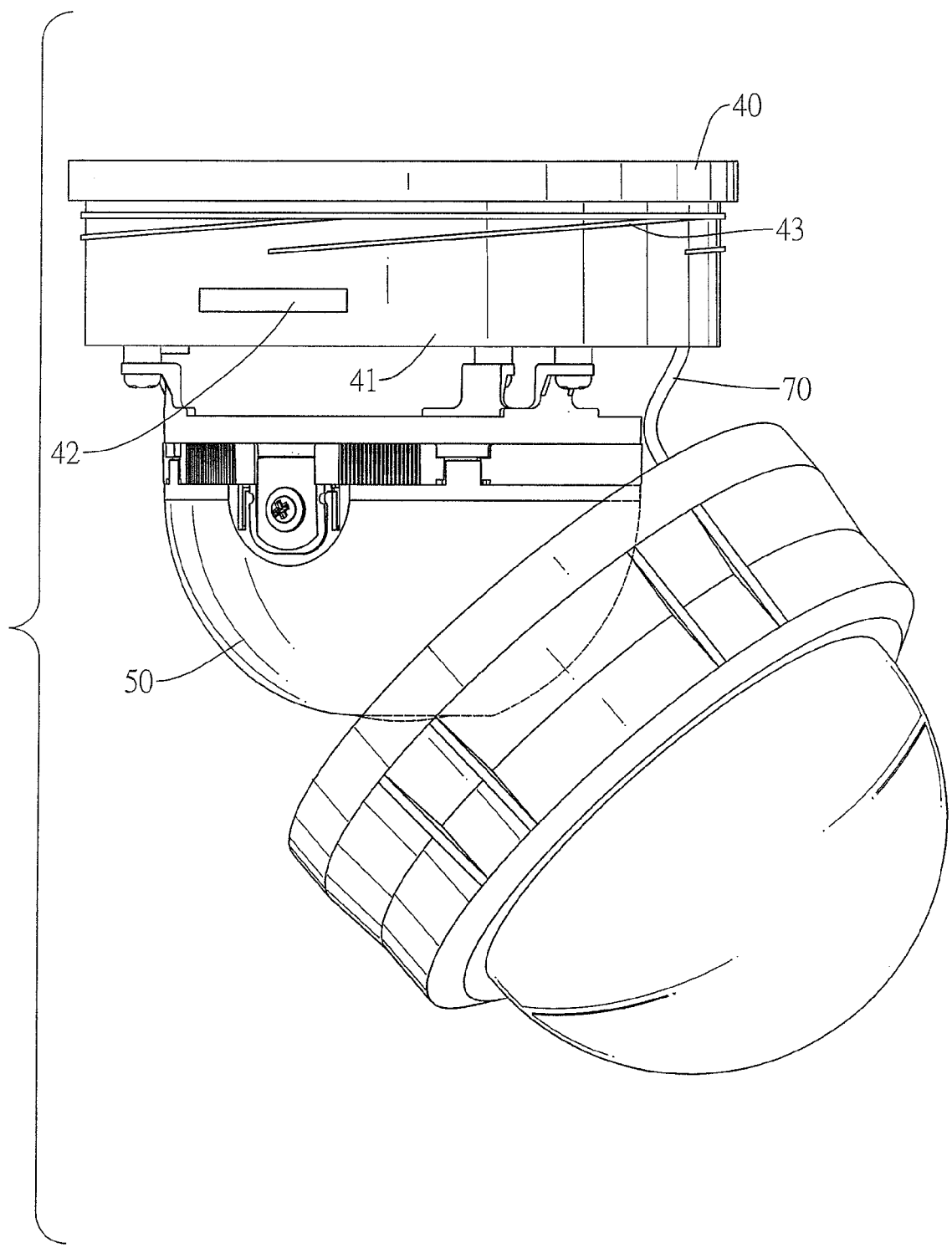
FIG. 6 is an exploded side view of another conventional monitoring camera.

With further reference to FIGS. 3 and 4, when turning the casing (30) toward the entrance sections (131), the guide protrusions (31) move along the corresponding support sections (133) and enter the notches (132), may be due to the rounded section (132c) of the notches (132). The vertical walls (132a) of the notches (132) are capable of stopping the corresponding guide protrusions (31) from moving to the entrance sections (131) of the corresponding guide slots (13). The guide protrusions (31) are subsequently mounted in the notches (132) and the memory slot (12) is accessible. Accordingly, the casing (30) hangs from under the base (10) conveniently without extra fittings or blocking operation of the camera module (20).

Furthermore, the casing (30) may be detached from the base (10) by pressing the guide protrusions (31) upwardly out of the notches (132). Therefore, the casing (30) need not to be completely detached from the base (10) to allow a user to install or uninstall the removable memory in or out from the memory slot (12). Moreover, the guide slots (13) in the present invention do add little costs to manufacture due to redesign and retooling.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A monitoring camera comprising:
   a base having a bottom and a parapet being formed on the bottom of the base and having
      a memory slot being formed in the parapet adjacent to the bottom of the base;
      an outer surface having a bottom; and
      at least one pair of guide slots being formed oppositely on the outer surface of the parapet, and each guide slot having
         a notch extending toward the bottom of the parapet;
   a camera module being mounted on the bottom of the base; and
   a casing corresponding to and covering the parapet and the camera module and having
      an inner surface; and
      at least one pair of guide protrusions being formed oppositely on the inner surface of the casing, engaging and moving along corresponding guide slots.

2. The monitoring camera as claimed in claim 1, wherein each guide slot further comprises:
   an entrance section being formed obliquely from the bottom of the outer surface of the parapet and tapering inwardly; and
   a support section curving parbolically toward the bottom of the base, running parallel with the base and communicating with the entrance section; and
   the notches of the guide slots are below the memory slot, are disposed between and communicate with the corresponding entrances and support sections.

3. The monitoring camera as claimed in claim 2, wherein when turning the casing toward the entrance sections, the guide protrusions move along the corresponding support sections, enter the notches and are subsequently mounted in the notches so the memory slot is accessible.

4. The monitoring camera as claimed in claim 2, wherein each notch further comprises:
   a vertical wall connects to the corresponding entrance section;
   a notch bottom connects to the corresponding vertical wall and is lower than the memory slot; and
   a rounded wall connects to the notch bottom and is adjacent to the corresponding support section.

5. The monitoring camera as claimed in claim 3, wherein each notch further comprises:
   a vertical wall connects to the corresponding entrance section and stops the corresponding guide protrusion from move to the corresponding entrance section when turning the casing toward the entrance sections;
   a notch bottom connects to the corresponding vertical wall and is lower than the memory slot; and
   a rounded wall connects to the notch bottom and is adjacent to the corresponding support section.

6. The monitoring camera as claimed in claim 1, wherein:
   the parapet has two pairs of guide slots; and
   the casing has two pairs of guide protrusions corresponding respectively to the guide slots.

7. The as claimed in claim 2, wherein:
   the parapet has two pairs of guide slots; and
   the casing has two pairs of guide protrusions corresponding respectively to the guide slots.

8. The as claimed in claim 3, wherein:
   the parapet has two pairs of guide slots; and
   the casing has two pairs of guide protrusions corresponding respectively to the guide slots.

9. The as claimed in claim 4, wherein:
   the parapet has two pairs of guide slots; and
   the casing has two pairs of guide protrusions corresponding respectively to the guide slots.

10. The as claimed in claim 5, wherein:
    the parapet has two pairs of guide slots; and
    the casing has two pairs of guide protrusions corresponding respectively to the guide slots.

* * * * *